United States Patent [19]

Hiraoka et al.

[11] Patent Number: 5,418,917
[45] Date of Patent: May 23, 1995

[54] METHOD AND APPARATUS FOR CONTROLLING CONDITIONAL BRANCH INSTRUCTIONS FOR A PIPELINE TYPE DATA PROCESSING APPARATUS

[75] Inventors: Tooru Hiraoka; Kouji Nakamura, both of Hadano; Tohru Shonai, Kodaira, all of Japan

[73] Assignees: Hitachi, Ltd.; Hitachi Microcomputer System Ltd., both of Tokyo, Japan

[21] Appl. No.: 724,113

[22] Filed: Jul. 1, 1991

[30] Foreign Application Priority Data

Jun. 29, 1990 [JP] Japan ................. 2-170036

[51] Int. Cl.⁶ .............................................. G06F 9/38
[52] U.S. Cl. ...................... 395/375; 395/800; 364/231.8; 364/261.5; 364/DIG. 1
[58] Field of Search ............. 395/375, 400, 425, 800

[56] References Cited

U.S. PATENT DOCUMENTS

| | | | |
|---|---|---|---|
| 4,477,872 | 10/1984 | Losq | 395/375 |
| 4,691,277 | 9/1987 | Kronstadt et al. | 395/400 |
| 4,742,451 | 5/1988 | Bauckert et al. | 395/375 |
| 4,847,753 | 7/1989 | Matsuo et al. | 395/375 |
| 4,882,701 | 11/1989 | Ishii | 395/375 |
| 5,034,880 | 7/1991 | Fong et al. | 395/375 |
| 5,127,091 | 6/1992 | Boufarah | 395/375 |
| 5,237,666 | 8/1993 | Suzuki et al. | 395/375 |

FOREIGN PATENT DOCUMENTS 63-247833  10/1988  Japan .

*Primary Examiner*—Alyssa H. Bowler
*Assistant Examiner*—Alpesh M. Shah
*Attorney, Agent, or Firm*—Antonelli, Terry Stout & Kraus

[57] ABSTRACT

A method and apparatus for controlling a conditional branch instruction in a pipeline type data processing apparatus which are adapted to judge whether or not a conditional branch instruction is valid, judge whether or not a condition code necessary for a taken/not-taken judgement made for the conditional branch instruction is valid, and selectively make a taken/not-taken judgement for the conditional branch instruction in accordance with the results of the judgements made to the conditional branch instruction and the condition code.

17 Claims, 7 Drawing Sheets

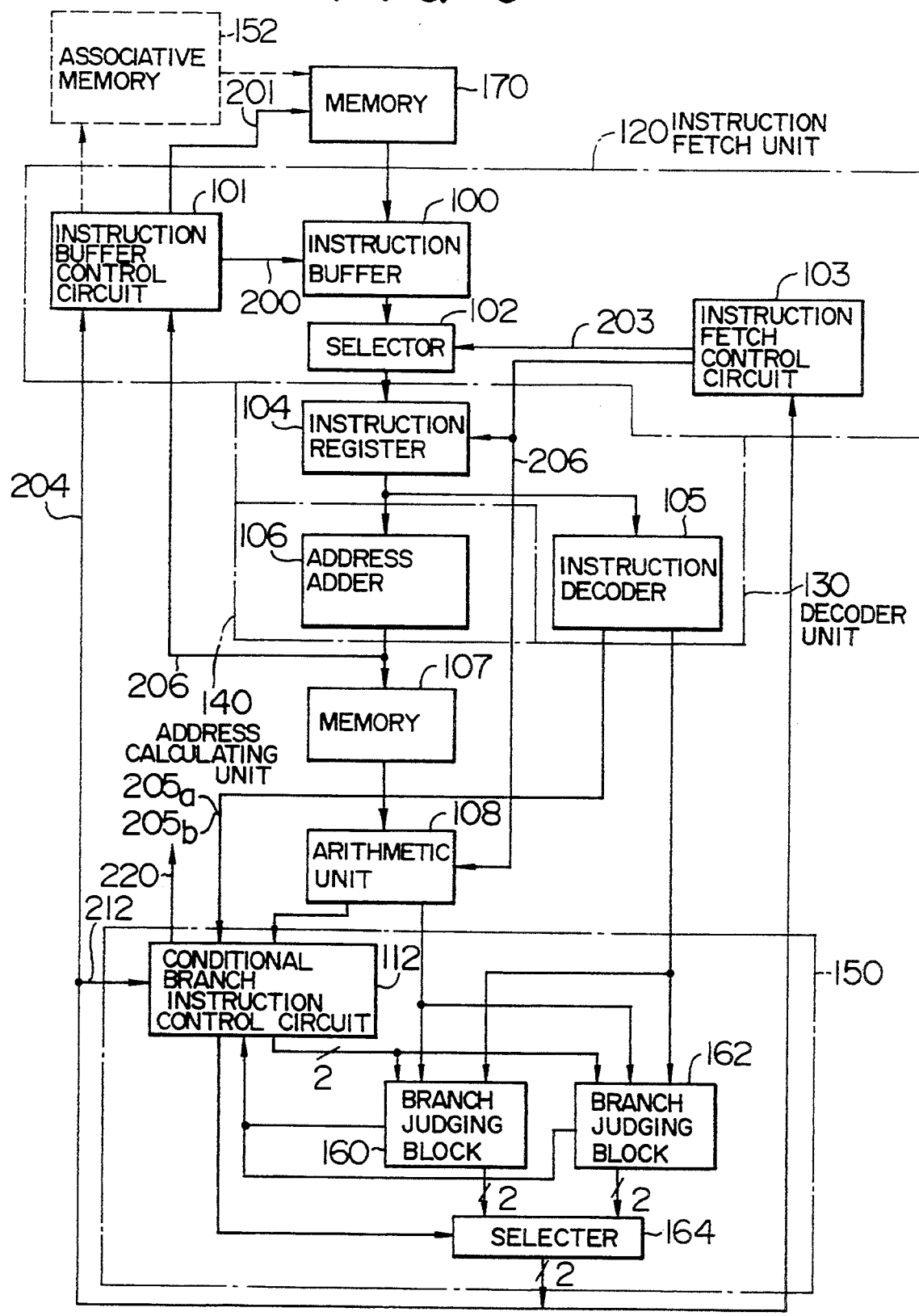
F I G. 5

METHOD AND APPARATUS FOR CONTROLLING CONDITIONAL BRANCH INSTRUCTIONS FOR A PIPELINE TYPE DATA PROCESSING APPARATUS

BACKGROUND OF THE INVENTION

The present invention relates to a method and apparatus for controlling conditional branch instructions for a pipeline type data processing apparatus.

FIG. 1 is a block diagram showing an example of a prior art pipeline type data processing apparatus. In FIG. 1, an instruction fetch unit 20 comprises an instruction buffer 300 for storing instructions read out of a memory 370, an instruction buffer control circuit or an instruction buffer controller 301 for controlling to write instructions from the memory 370 to the instruction buffer 300 and to read instructions from the instruction buffer 300, a selector 302 for selecting an instruction from the instruction buffer 300, and an instruction fetch control circuit or controller 303 for controlling the selector 302. A decoder unit 30 comprises an instruction register 304 for storing an instruction selected by the selector 302 and an instruction decoder 305 for decoding an instruction stored in the instruction register 304. An address calculating unit 40 comprises an address adder 306 for performing an address calculation. Reference numeral 307 designates an operand memory, and 308 an arithmetic unit. A branch judging unit 50 comprises a condition code store register 309 for storing a conditional code derived by the arithmetic unit 308, a branch condition store register 310 for storing a branch condition or an instruction mask bit of a conditional branch instruction or a branch on condition decoded by the instruction decoder 305, a condition comparing circuit or a condition comparator 311 for performing a condition comparison between the conditional branch instruction and contents stored in the condition code store register 309 and in the branch condition store register 310, and AND gates 313, 314 for determining whether or not a branch instructed by the condition branch instruction is taken on the basis of the comparison result obtained by the condition comparing circuit 311 and a conditional branch instruction executing command generated from the arithmetic unit 308 which indicates the execution of the conditional branch instruction. The outputs from the respective AND gates are signals indicating the judgement results, that is, whether a branch is taken or not.

A prior art pipeline type data processing apparatus will next be described with reference to a flowchart of a pipeline shown in FIG. 2.

In FIG. 2 the abscissa represents an executing cycle of a pipeline, where references ①  through ⑮ are given for convenience so that each of sequential cycles can be referred to.

An example shown in FIG. 2 illustrates a case where instruction 2, instruction 3 and instruction 4, which do not cause a change in condition code, are executed subsequent to instruction 1 which causes a change in condition code, and next a conditional branch instruction 5 is executed.

After a determination has been made that a branch of the conditional branch instruction has been taken, instruction 6 and instruction 7, which are branch target destinations branched from the conditional branch instruction, are to be further executed.

The instruction 1 causing a change in condition code, fetched by the buffer 300, is selected by the selector 302 and input into the pipeline, that is, input into the register 304 at cycle ①, accesses the memory 307 at an address calculated by the address calculating circuit 306, executes an operation shown in the operand by the arithmetic unit 308 at cycle ⑤, obtains a condition code from the operation result, and sets the condition code in the register 309 at cycle ⑥.

The instruction 2 is input into the pipeline one cycle after the instruction 1 was, that is at cycle ②, and executes an operation to obtain a condition code at cycle ⑥. At this time, since the instruction 2 does not cause a change in condition code, the condition code set in the register 309 by the instruction 1 is not changed by the instruction 2.

Similarly, the instructions 3, 4 are input into the pipeline at cycles ③, ④, respectively, however, the condition code is not changed by either of them. The conditional branch instruction 5 is input into the pipeline at cycle ⑤. The conditional branch instruction 5 calculates at cycle ⑤ the address of a branch target instruction, accesses the memory 370 at the calculated branch target address through the instruction buffer control circuit 301, and reads from the memory 370 instruction 6 which is the branch target instruction at cycle ⑨. However, since a branch judgement has not been made, the branch target instruction is inhibited from being input into the pipeline. In consideration of a case where the branch is not taken, subsequent instructions are sequentially input into the pipeline at cycles ⑥, ⑦, . . . by the instruction fetch control circuit 303 before the branch judgement is given out. A branch condition defined by the conditional branch instruction 5 is decoded by the instruction decoder 305 at cycle ⑤, and the decoded branch condition is set in the register 310 at cycle ⑥. The condition code stored in the register 309 and the branch condition thus set in the register 310 are compared with each other by the condition comparing circuit 311, and the comparison result is output to the AND gates 313, 314. An execution command for executing the conditional branch instruction 5 is issued at cycle ⑨ by the arithmetic unit 308 and given to the AND gates 313, 314. A judgement is made to whether the branch is taken or not taken at cycle ⑨ from the execution command for the conditional branch instruction 5 and the comparison result from the condition comparing circuit 311. More specifically, when the execution command is output, it is judged that the branch is taken if coincidence of the condition codes is indicated between the output from the condition comparing circuit 311 and the branch condition, whereby the AND circuit 313, responsive to the judgement, outputs "1". The instruction 6, which is the branch target instruction, is then fetched from the buffer 300 by the control circuit 303 and the selector 302 and input into the pipeline at cycle ⑩, i.e., five cycles after the conditional branch instruction 5 has been input into the pipeline.

On the contrary, if the comparison result shows a discrepancy, the branch defined by the conditional branch instruction 5 is judged to be not-taken, and the AND gate 314 responsively outputs "1". As described above, a method of sequentially inputting instructions subsequent to the conditional branch instruction 5 into the pipeline is applied in consideration of the case where the branch is judged to be not-taken, so that a delay will not take place particularly with respect to the execution of instructions. When the branch is not taken, the branch target instructions 6, 7 read out of the memory 370 to be branched from the conditional branch instruction 5 are made invalid by the control circuit 303. On the contrary, when the branch is taken, subsequent instructions previously input into the pipeline are made invalid by the control circuit 303, thereby incurring no inconvenience.

In FIG. 2, in spite of setting the condition code of the instruction 1 at cycle ⑥, the branch taken judgement is made at cycle ⑨, that is, in response to the execution command for the conditional branch instruction 5, by the following reason.

If the branch taken judgement were made at cycle ⑥, an erroneous branch would be taken when the condition code of the instruction 1 cannot be set at cycle ⑥, for example, because the operand of the instruction 1 is missing in the memory 370.

For this reason, in the prior art the branch taken judgement is made at cycle ⑨ (an execution cycle of the conditional branch instruction) at which the condition code of the previous instruction has usually been definite. This type of apparatus, disclosed in JP-A-63-247833, is given as an example.

Generally, the performance of branch instruction processing decreases as a branch target instruction is fetched with a larger delay or as processing time for a judgement on taken/not-taken increases.

The above described prior art does not take account of the judgement on taken/not-taken for the case where a condition code has been definite earlier than the executing cycle of a conditional branch instruction. Therefore, the judgement on taken/not-taken is delayed until after execution of the executing cycle of the conditional branch instruction even though a condition code as well as a branch condition have already been definite, which leads to delay decoding and execution of branch target instructions and accordingly deteriorate the performance of branch processing.

SUMMARY OF THE INVENTION

It is an object of the present invention to provide a method and apparatus for controlling conditional branch instructions for a pipeline type data processing apparatus which is capable of removing the above-mentioned defects inherent to the prior art and improving the performance of branch processing.

It is another object of the present invention to provide a method and apparatus for controlling conditional branch instructions which is capable of making a judgement on taken/not-taken prior to the executing cycle of a conditional branch instruction when a condition code has been definite prior to the executing cycle of the conditional branch instruction.

To achieve the objects as mentioned above, according to one aspect of the present invention, the method and apparatus for controlling conditional branch instructions for a pipeline type data processing apparatus are adapted to judge whether or not a conditional branch instruction is valid, judge whether or not a condition code necessary for making a judgement on taken/not-taken for the conditional branch instruction is valid, and selectively making the judgement on taken/not-taken for the conditional branch instruction in accordance with the results of the judgements made regarding the conditional branch instruction and the condition code.

Preferably, when the conditional branch instruction and the condition code are both judged to be valid, the judgement on taken/not-taken is made for the conditional branch instruction.

According to another aspect of the present invention, the method and apparatus for controlling conditional branch instructions for a pipeline type data processing apparatus comprises a first identifier or flag for indicating whether or not a conditional branch instruction is valid, a second identifier for indicating whether or not a condition code is valid, and a conditional branch instruction control circuit for controlling states of the first identifier and the second identifier, wherein a judgement on taken/not-taken is made based on a state of the first identifier, a state of the second identifier, and the result of a condition comparison performed by a condition comparing circuit for comparing a branch condition of the conditional branch instruction with the condition code.

Preferably, when the branch condition of the conditional branch instruction is decoded, the branch condition is set in a branch condition store unit and simultaneously the first identifier for indicating whether or not the conditional branch instruction is valid is set to a first state. On the other hand, at the same time as the condition code needed by the conditional branch instruction is set in a condition code store unit, the second identifier for indicating whether or not the condition code is valid is set to a first state. When the first identifier and the second identifier are both set to the first state, a judgement on taken/not-taken is made on the basis of the result of a condition comparison performed by the condition comparing circuit. Since the judgement on taken/not-taken causes the first identifier to be set to a second state, the judgement on taken/not-taken for subsequent cycles is inhibited.

Thus, every time a conditional branch instruction is input into a pipeline, the judgement on taken/not-taken is made, while the first identifier for indicating whether or not the conditional branch instruction is valid and the second identifier for indicating whether or not a condition code is valid are continually monitored.

According to the present invention, the judgement on taken/not-taken can be made for a conditional branch instruction at an earlier time, thereby making it possible to decode and execute branch target instructions earlier.

It is also possible to improve pipeline efficiency and enhance a processing speed of the processing apparatus.

BRIEF DESCRIPTION OF THE DRAWINGS

FIG. 5 is a block diagram illustrating a modified example of the embodiment shown in FIG. 3;

DESCRIPTION OF THE PREFERRED EMBODIMENTS

Figure 1:
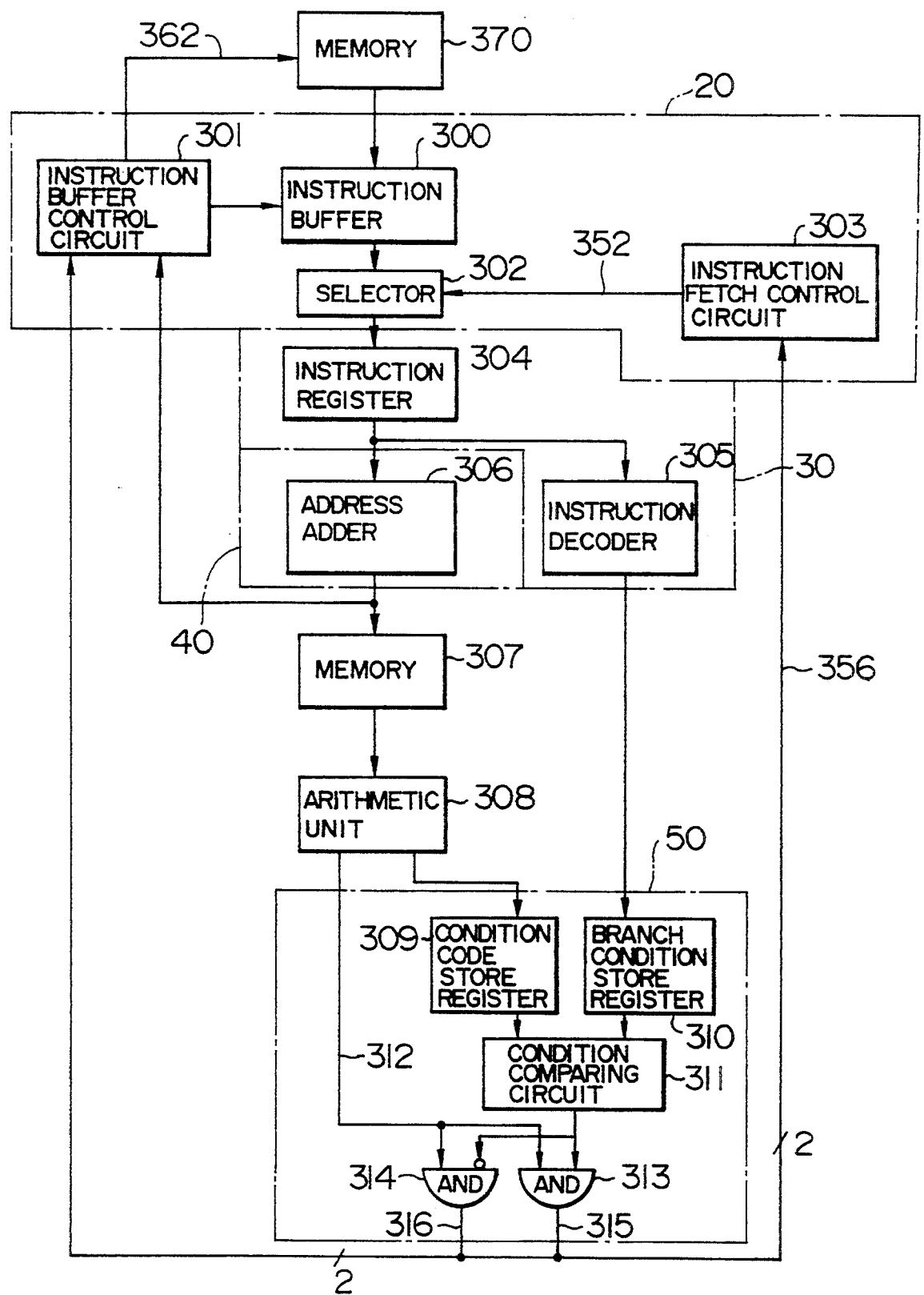
FIG. 1 is a block diagram illustrating an example of the configuration of a conditional branch instruction control unit in a prior art pipeline type data processing apparatus.

A method and apparatus for controlling conditional branch instructions for a pipeline type data processing apparatus according to the present invention will hereinbelow be described in detail with reference to the accompanying drawings. In the drawings, elements having the same function are designated the same reference numerals, and a repetitive explanation thereof will be omitted.

Figure 3:
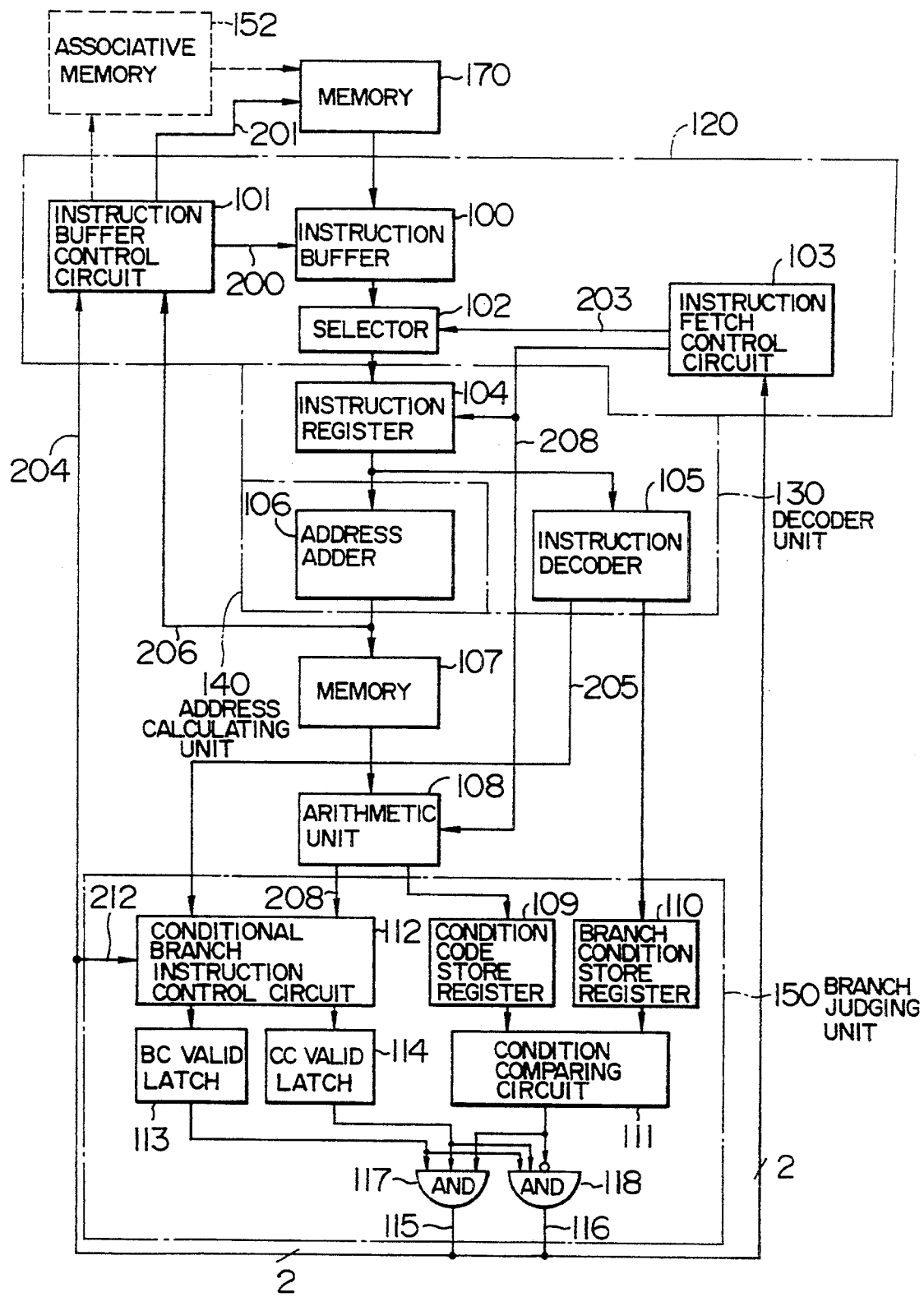
FIG. 3 is a block diagram illustrating the configuration of an embodiment of an apparatus for controlling conditional branch instructions in a pipeline type data processing apparatus.

FIG. 3 is a block diagram illustrating the configuration of an embodiment of an apparatus for controlling conditional branch instructions according to the present invention.

In FIG. 3, an instruction fetch unit 120 comprises an instruction buffer 100 for storing instructions read out of a memory 170, an instruction buffer control circuit or an instruction buffer controller 101 for controlling a write of instructions from the memory 170 to the instruction buffer 100 and a read of instructions from the instruction buffer 100, a selector 102 for selecting an instruction from the instruction buffer 100, and an instruction fetch control circuit or an instruction fetch controller 103 for controlling the selector 102. A decoder unit 130 comprises an instruction register 104 for storing an instruction selected by the selector 102 and an instruction decoder 105 for decoding the instruction stored in the instruction register 104. An address calculating unit 140 comprises an address adder 106 for calculating addresses. Reference numeral 107 designates a memory for operand, and 108 an arithmetic unit.

A branch judging unit 150 comprises a condition code store register 109 for storing a condition code derived by the arithmetic unit 108, a branch condition store register 110 for storing a branch condition or an instruction mask bit defined by a conditional branch instruction or a branch on condition decoded by the instruction decoder 105, a condition comparing circuit or a condition comparator 111 for performing a condition comparison for a conditional branch instruction based on contents stored in the condition code storing register 109 and in the branch condition storing register 110, a latch 113 for storing an identifier or flag (BC Valid) for indicating whether a conditional branch instruction is valid or invalid, a latch 114 for storing an identifier or flag (CC Valid) for indicating whether a condition code needed by a conditional branch instruction is valid or invalid, a conditional branch instruction control circuit or a conditional instruction controller 112 for controlling states of the identifiers BC Valid, CC Valid stored in the latches 113, 114, and AND gates 117, 118 for performing a judgement on taken/not-taken for a conditional branch instruction based on the comparison result derived by the condition comparing circuit 111 and the identifiers stored in the latches 113, 114. Output signals 115, 116 of the AND gates 117, 118 are signals indicating the result of a judgement on taken/not-taken made for a conditional branch instruction.

Figure 2:
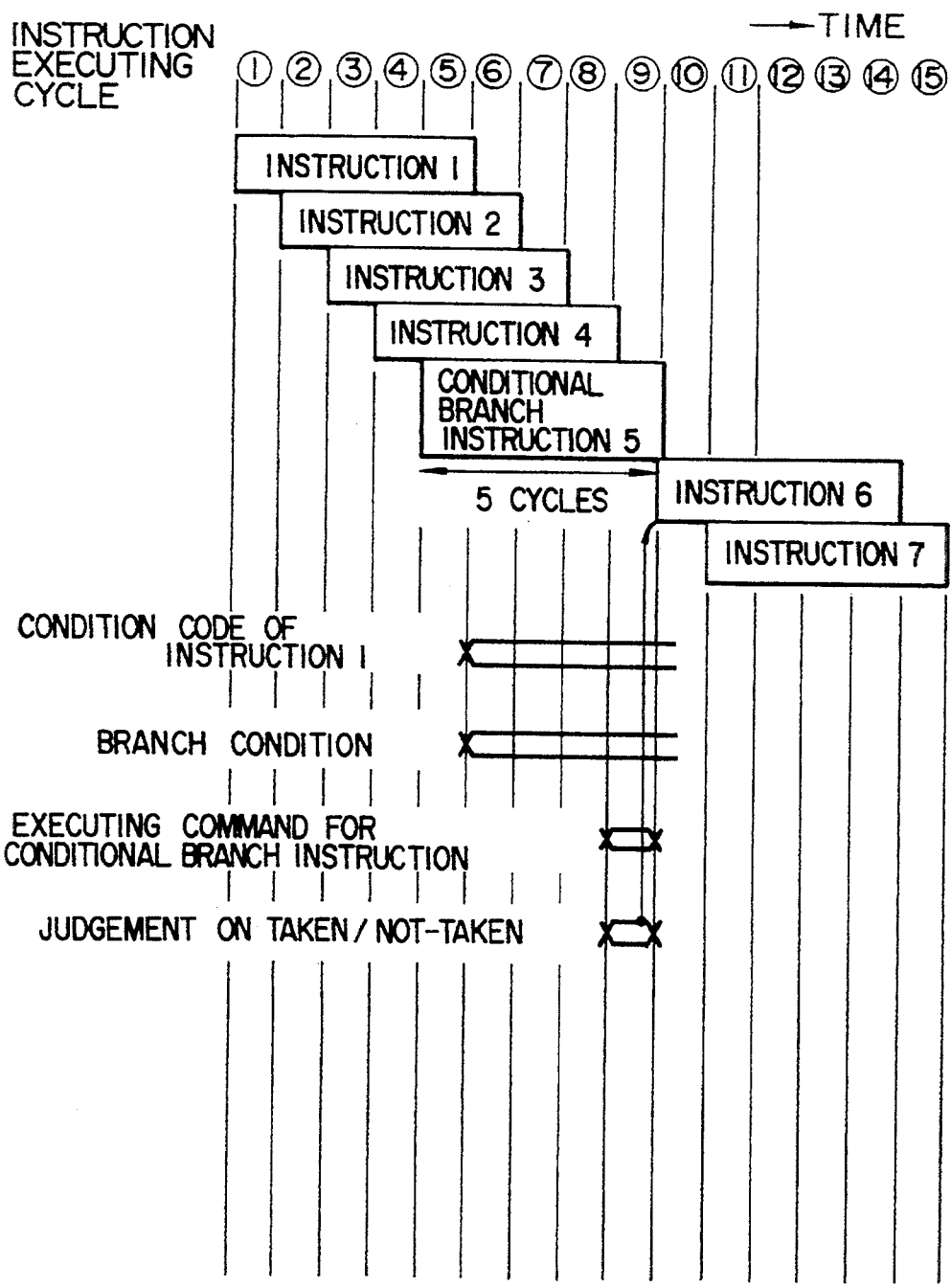
FIG. 2 is a diagram explaining an example of operations performed by the prior art apparatus shown in FIG. 1.
Figure 4:
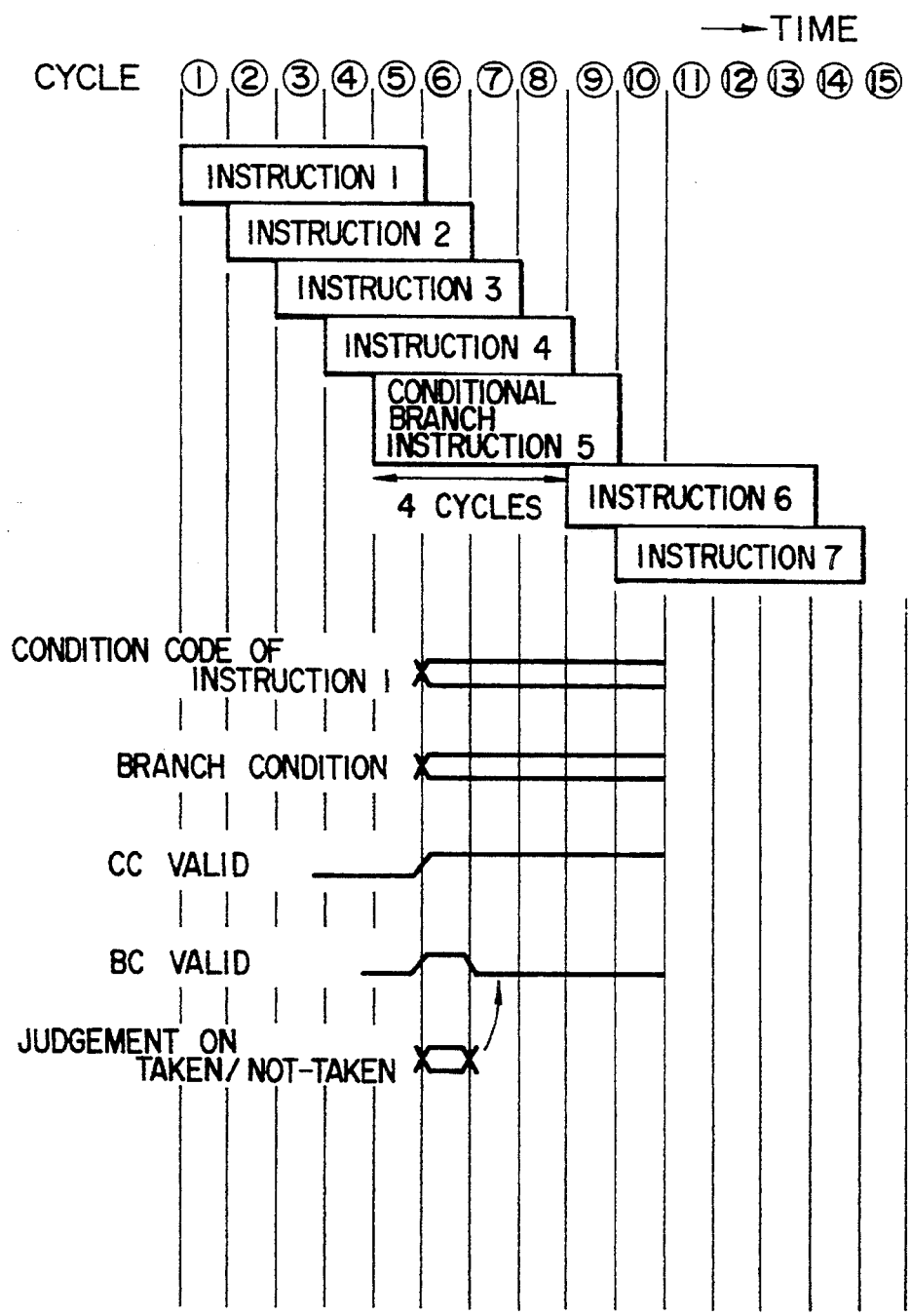
FIG. 4 is a diagram explaining an example of operations performed by the apparatus shown in FIG. 3.

The operation of the present embodiment will next be described with reference to a flow diagram shown in FIG. 4. FIG. 4 corresponds to the flow diagram shown in FIG. 2 illustrating the operation of a prior art system, where specific examples such as symbols, reference numerals, shown instructions are commonly used in these two diagrams, so that a repetitive explanation will be omitted.

The illustrated example executes instruction 2, instruction 3, and instruction 4 which do not cause a change in condition code (for example, "load" instruction) subsequent to instruction 1 causing a change in condition code (for example, "add" instruction), and next executes conditional branch instruction 5. Further, after a judgement on taken/not-taken has been made for the conditional branch instruction 5, instruction 6 and instruction 7, which are branch target instructions branched from the conditional branch instruction 5, are executed.

The instruction 1 fetched in the buffer 100 is selected by the selector 102 and input into a pipeline, that is, input into the register 104 at cycle ①, while an instruction for modifying a condition code of the instruction 1 is decoded by the instruction decoder 105, and the result thereof is supplied to the control circuit 112. The instruction 1 further performs an address calculation by the address adder 106 to access the memory 107 at the calculated address, an operation indicated in the operand of the instruction 1 is executed by the arithmetic unit 108 at cycle ⑤, and a condition code is derived from the operation result and set in the condition code register 109 at cycle ⑥.

The arithmetic unit 108 sets the derived condition code in the register 109 at cycle ⑥ and simultaneously supplies a control signal 208 to the conditional branch instruction control circuit 112. The control circuit 112 responsively sets the identifier CC Valid stored in the latch 114 to a value indicating that the condition code is valid, for example, "1" based on this control signal 208 and the condition code modifying instruction decoding result from the instruction decoder 105. Thus, it is judged that "a condition code is valid" when the condition code is derived by the unit 108 from the result obtained by operating the operand of the latest instruction 1 causing a change in condition code prior to the conditional branch instruction 5 by means of the arithmetic unit 108. The derived condition code in this case refers to "+", "−", an overflow, and so on when the instruction 1 is, for example, "add" instruction.

The instruction 2 is input into the pipeline at cycle ② one cycle after the instruction 1 has been input into the pipeline and executes an operation at cycle ⑥. At this time, since the instruction 2 does not cause a change in condition code, the condition code stored in the register 109, set by the instruction 1, is not changed. Therefore, the value of the identifier CC Valid in the latch 114 remains at "1".

Similarly, the instruction 3 and instruction 4 are sequentially input into the pipeline at cycles ③, ④, however, the conditional code is not changed by either of these instructions. The conditional branch instruction 5 is input into the pipeline at cycle ⑤. The conditional branch instruction 5 calculates the address of a branch target instruction by means of the address adder 106 at cycle ⑤, accesses the memory 170 at the calculated branch target address through the instruction buffer control circuit 101, and reads the instruction 6, that is, a branch target instruction from the memory 150 at cycle ⑨. The instruction 6, however, is not input into the pipeline yet. Incidentally, in consideration of a case where the branch is not taken, instructions subsequent to the instruction 5 are sequentially input into the pipeline at cycles ⑥, ⑦, . . . by the instruction fetch control circuit 103. On the other hand, the branch condition defined by the conditional branch instruction 5 is decoded by the instruction decoder 105 at cycle ⑥, and the decoded branch condition is set in the register 110.

The instruction decoder 105 simultaneously supplies a control signal 205 to the conditional branch control circuit 112 which, in response to this control signal 205, sets at cycle ⑥ the identifier BC Valid in the latch 113 to a value indicating that the conditional branch instruction is valid, for example, "1". In other words, if a conditional branch instruction is decoded by the decoder 105, the conditional branch instruction is judged to be valid. The contents of the respective latches 113, 114 are supplied to the AND gates 117, 118. The condition code stored in the register 109 and the branch condition stored in the register 110 are compared with each other by the condition comparing circuit 111, and the comparison result is input to one input terminal of the AND gate 117 as well as to an inverting input terminal of the AND gate 118. It is supposed in the present embodiment that a value "1", for example, indicates coincidence of the condition code and the branch condition while a value "0" indicates discrepancy of the same.

At cycle ⑥ when the identifiers BC Valid and CC Valid both present "1" indicating the validity of the condition code and the branch condition, a judgement on taken/not-taken is made based on the comparison result output from the condition comparing circuit 111.

Stated another way, in response to the latches 113, 114 both set to "1", a condition judgement is made based on the condition comparison result. More specifically, when the latches 113, 114 are both set to "1", if the comparison result indicates coincidence of the condition code and the branch condition, the AND gates 117, 118 output "1", "0", respectively, thereby judging that the branch from the conditional branch instruction 5 is taken. On the contrary, if the comparison result indicates a discrepancy, the AND gates 117, 118 output "0", "1", respectively, thereby judging that the branch is not taken.

When the branch is judged to be taken, the conditional branch instruction control circuit 112 is supplied with a signal indicating that a branch has been taken (for example, "1", or a taken signal) through a signal line 212 and responsively sets the identifier BC Valid in the latch 113 to "0" indicating that a conditional branch instruction is not valid, whereby the AND gate 117 outputs "0" at cycle ⑦ as shown in FIG. 4.

On the contrary, if the branch is not taken, the AND gate 118 outputs a signal "1" indicating that a branch has not been taken (a not-taken signal) which is supplied to the control circuit 112 which in turn sets the latch 113 to "0".

The conditional branch circuit 5 is supplied to the address adder 106 at cycle ⑤ for calculating the address of a branch target instruction. The calculated branch target address is supplied through a signal line 206 to the instruction buffer control circuit 101 which responsively accesses the memory 150 through a signal line 201, reads out a branch target instruction from the memory 150 at cycle ⑧ and supplies the same to the instruction buffer 100.

As described above, when the branch is taken, the instruction 6, that is, the branch target instruction is fetched from the buffer 100 by the selector 102 under the control of the control circuit 103 responsive to the taken signal and input into the pipeline at cycle ⑨ which is four cycles after the conditional branch instruction 5 has been input into the pipeline.

Also, when the branch is taken, subsequent instructions previously input into the pipeline at cycles ⑥, ⑦, ... are made invalid by the control circuit 103. More specifically, the subsequent instructions stored in the instruction register 104, the arithmetic unit 108 and so on are made invalid by a control signal on the signal line 208 delivered from the control circuit 103. Further, in response to the taken signal on the signal line 204, the instruction buffer control circuit 101 invalidates the subsequent instructions stored in the buffer 100.

On the other hand, if the branch is not taken, the instruction buffer control circuit 101, in response to the not-taken signal from the AND gate 118, invalidates the branch target instruction 6 supplied to the instruction buffer 100, which leads to execution of execution the instructions subsequent to the conditional branch instruction 5 which have previously been input into the pipeline in consideration of the case where the branch is not taken.

Incidentally, if instructions subsequent to the instruction 5 include one which causes a change in condition code, the decoder 105 decodes this instruction and supplies the control signal 205 to the conditional branch instruction control circuit 112, whereby the identifier CC Valid in the latch 114 is set to "0". The identifier CC Valid is again set to "1" when a condition code of an instruction is afterward derived by the arithmetic unit 108.

According to the present embodiment, it is possible, as shown in FIG. 4, to make a judgement on taken/not-taken for a conditional branch instruction at an earlier time and accordingly decode and execute branch target instructions earlier, thereby improving the pipeline efficiency and enhancing processing speed of the processing apparatus.

Additionally, when the above described embodiment is provided with an associative memory 152 as indicated by a broken line in FIG. 3, a branch target instruction can be read earlier in the following manner in place of accessing the memory 170 in response to the address of a branch target instruction on the signal line 206 by means of the instruction buffer control circuit 101.

When the instruction buffer control circuit 101 reads the conditional branch instruction 5 from the memory 170, the control circuit 101 accesses the associative memory 152 which responsively supplies the address of a branch target instruction corresponding to the instruction 5 stored therein to the memory 170 as an instruction read request, fetches the branch target instructions 6, 7, and supplies the same to the buffer 100.

It is therefore possible to fetch the branch target instructions from the memory 170 prior to a judgement at cycle ⑥ and accordingly input the instruction 6 into the pipeline at cycle ⑦. In other words, the judgement is made at cycle ⑥ immediately after the condition code and the branch condition have been made definite, and the branch target instruction 6 can be input into the pipeline at cycle ⑦ immediately after the judgement.

Also, if a plurality of conditional branch instructions are input into a pipeline, the provision of a plurality of the latch circuits 113, 114, the condition code store register 109, the branch condition store register 110, the condition comparing circuit 111, and the AND gates 117, 118 enables judgements on taken/not-taken to be made independently for each of the conditional branch instructions.

Figure 6:
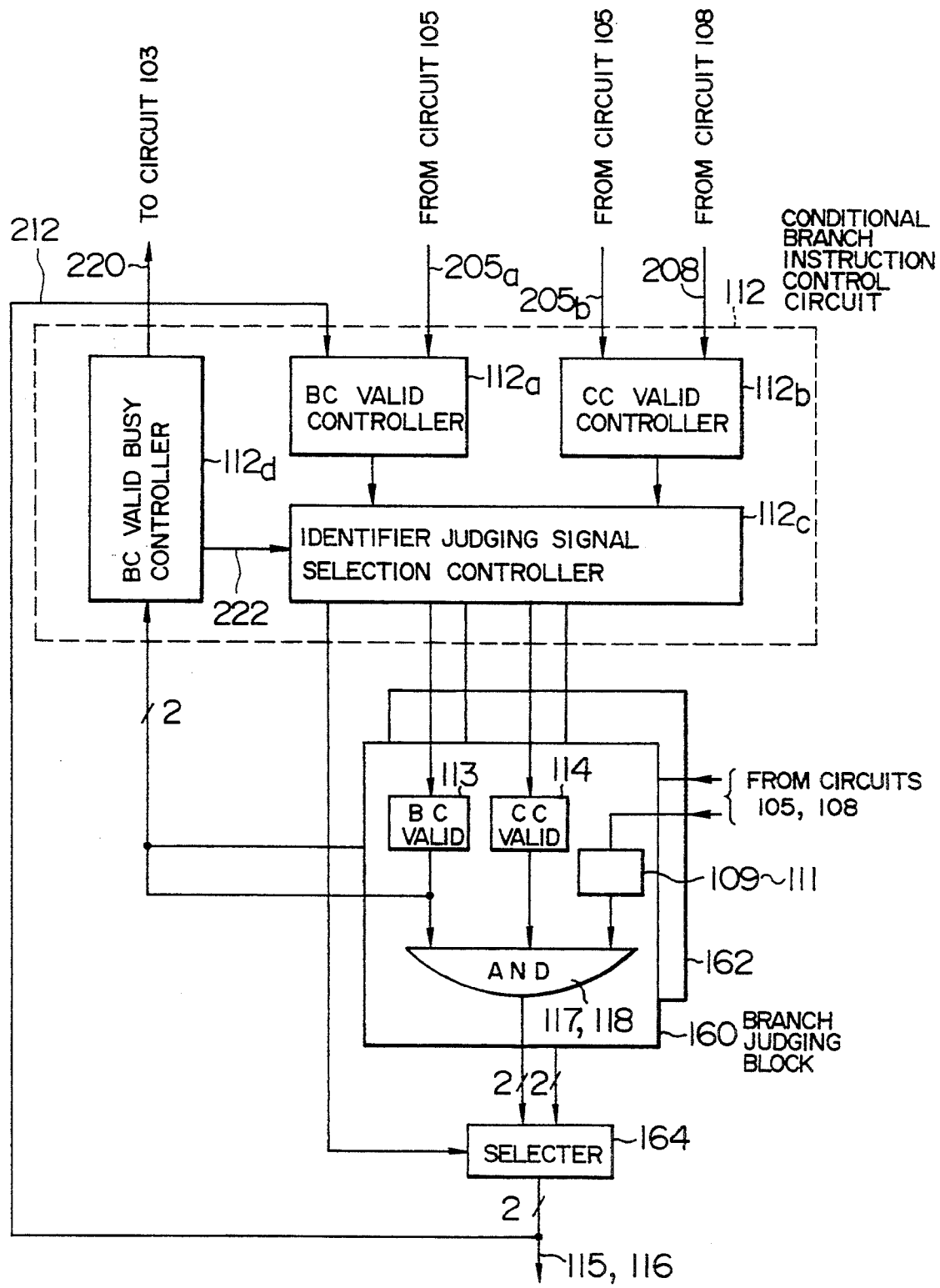
FIG. 6 is a block diagram illustrating the configuration of a conditional branch instruction control circuit shown in FIG. 5.

An example of such a configuration is illustrated in FIG. 6. FIG. 6 shows a case where two of the respective elements 109–111, 113, 114, 117, 118 are provided, by way of example. Branch judging blocks 160, 162 respectively have the elements 109–111, 113, 114, 117, 118 of FIG. 3 in the same configuration as that shown in FIG. 3. A conditional branch instruction control circuit 112 is used commonly by the branch judging blocks 160, 162. A selector 164 selects one of the judgement results from the respective blocks 160, 162. The control circuit 112 supplies a selection control signal to the selector 164 in accordance with a processed conditional branch instruction.

Figure 7:
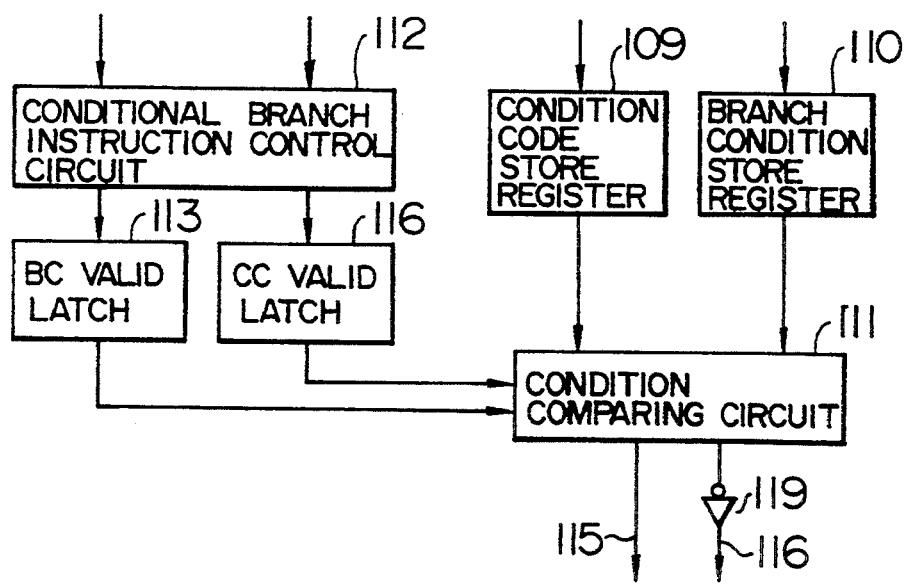
FIG. 7 is a block diagram illustrating a modified example of a branch judging unit employed in the embodiment shown in FIG. 3.

Alternatively, the branch judging unit 150 shown in FIG. 3 may be constructed as shown in FIG. 7 such that the comparing circuit 111 performs a comparison in response to the latches 113, 114 which have both been set to "1". In FIG. 7, reference numeral 119 designates an inverter.

FIG. 6 is a block diagram illustrating in detail an example of the configuration of the branch judging unit shown in FIG. 5. The conditional branch instruction control circuit 112 comprises a BC Valid controller 112a, a CC Valid controller 112b, an identifier judging signal selection controller 112 for selectively outputting one of identifier judging signals from the respective controller 112a, 112b, and a BC Valid busy controller 112d. The BC Valid controller 112a is responsive to a control signal 205a indicating that a branch condition has been decoded by the instruction decoder 105 to output an identifier judging signal indicating that the BC Valid is valid to the selection controller 112c. The CC Valid controller 112b, when it is supplied with a control signal 205b from the instruction decoder 105 indicating a condition code decoding result and a control signal 208 from the arithmetic unit 108 indicating that a condition code has been derived, supplies the selection controller 112c with an identifier judging signal indicating that the CC Valid is valid. When a plurality of conditional branch instructions are input into the pipeline, the selection controller 112c controls such that the identifier judging results of the BC Valid and the CC Valid for the identical conditional branch instructions are supplied to the identical branch judging block. More specifically, when the validity of the BC Valid for a certain conditional branch instruction (the validity of the conditional branch instruction) is notified by the identifier judging signal, the BC Valid in the latch included in the branch judging block 160 or 162 is set to "1", and responsive to the identifier judging signal indicating that the CC Valid of the conditional branch instruction is valid (the condition code is valid), the identifier CC Valid in the latch 114 included in the same branch judging block is set to "1".

When it is judged that the condition code and the branch condition of two conditional branch instructions are valid as a result of judgement of the identifiers for a plurality of conditional branch instructions, the selector 164 is supplied with a signal indicating which of the branch judgement results from the branch judging blocks 160, 162 takes preference.

The BC Valid busy controller 112d monitors states of the identifiers BC Valid in the latches 113 included in the respective branch judging blocks 160, 162 and controls which of the branch judging blocks to make a branch judgement when a next conditional branch instruction is input into the pipeline. More specifically, if either of the branch judging blocks 160, 162 has the BC Valid latch 113 set at "0", the controller 112d supplies the selection controller 112c with a control signal 222 such that the block with the BC Valid latch 113 set at "0" gives its identifier judging result. If both of the blocks 160,162 have the latch 113 set to "1", the control circuit 103 is supplied with a control signal 220 so as to inhibit a next conditional branch instruction from being input into the pipeline until the BC Valid in the latch 113 of either of the blocks 160, 162 is set to "0". Incidentally, it is supposed that the control signal 220 is output from the control circuit 112 also in the embodiment shown in FIG. 3 where a single branch judging block is provided. In this case, however, the control circuit 112 supplies the control signal 220 to the control circuit 103 in response to the BC Valid set to "1".

The BC Valid controller 112a is responsive to the control signal or taken signal 212 to supply the selection controller 112c with the identifier judging signal such that the identifier BC Valid of the corresponding conditional branch instruction is set to "0".

Also, the CC Valid controller 112b supplies the selection controller 112c with the identifier judging signal such that the CC Valid in the latch 114 included in the branch judging block, which has terminated a judgement, is set to "0" in response to the signal 205b indicative of a decoding result of an instruction which causes a change in condition code.

It should be noted that the present embodiment can also be applied to a conditional branch control apparatus having three or more branch judging blocks.

According to the present invention, since a judgement on taken/not-taken for a conditional branch instruction can be made at an earlier time, branch target instructions can be decoded and executed earlier.

For this reason, the pipeline efficiency is improved, which results in enhancing a processing speed of the processing apparatus.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A method for controlling conditional branch instructions in a pipeline type data processing apparatus, said method comprising the steps of:
   judging whether or not a conditional branch instruction is valid, including the steps of:
      judging that said conditional branch instruction is valid when said conditional branch instruction has been input into a pipeline and a branch condition thereof has been decoded, and
      judging that said conditional branch instruction is invalid when said conditional branch instruction has not been input into the pipeline or when a taken/not taken judgement has already been made for said conditional branch instruction;
   judging whether or not a condition code necessary for the taken/not taken judgement to be made for said conditional branch instruction is valid, including the step of judging that said condition code is valid when said condition code is derived from calculating an operand of a most recent instruction causing a change in condition code which has been input into the pipeline prior to said conditional branch instruction; and selectively making the taken/not taken judgement for said conditional branch instruction in accordance with a result of the judgement made to said conditional branch instruction and said condition code, wherein said step of selectively making the taken/not taken judgement includes the step of cancelling the taken/not taken judgement if said conditional branch instruction is judged to be invalid.

2. A method according to claim 1, wherein said step of selectively making a taken/not-taken judgement includes the step of comparing the decoded branch condition defined by said conditional branch instruction with the condition code derived from operating the operand of the most recent instruction causing a change in condition code and judging that a branch is taken when a comparison result indicates coincidence of the branch condition and the condition code.

3. A method for controlling conditional branch instructions in a pipeline type data processing apparatus, said method comprising the steps judging whether or not a conditional branch instruction is valid and setting a first identifier instruction indicating a result of said first judgement, wherein said step of setting the first identifier includes the steps of:

setting said first identifier to a first state when said conditional branch instruction has been input into a pipeline and a branch condition thereof has been decoded, and setting said first identifier to a second state when said conditional branch instruction has not been input into the pipeline or when a taken/not-taken judgement has already been made for said conditional branch instruction; and judging whether or not a condition code necessary for the taken/not taken judgement made for said conditional branch instruction is valid and setting a second identifier indicating a result of said second Judgement, wherein said step of setting the second identifier includes the steps of:

setting said second identifier to a first state when said condition code is derived from calculating an operand of a most recent instruction causing a change in condition code, the most recent instruction being input into the pipeline prior to said conditional branch instruction, and setting said second identifier to a second state when said condition code has not been derived; and selectively making a taken/not-taken judgement for said conditional branch instruction in accordance with said first and second judgement results indicated by said first and second identifiers, wherein said step of selectively making the taken/not taken judgement includes the step of cancelling the taken/not taken judgement if said first identifier is in the second state.

4. A method according to claim 3, wherein said step of selectively making the taken/not-taken judgement includes the step of comparing the decoded branch condition defined by said conditional branch instruction with the condition code derived from operating the operand of the most recent instruction causing a change in condition code, and judging that a branch is taken when said comparing step result indicates coincidence of the branch condition and the condition code.

5. A method according to claim 3, wherein said step of selecting making a taken/not-taken judgement for said conditional branch instruction includes the step of making said taken/not-taken judgement when said first and second identifiers are both in the first state.

6. An apparatus for controlling conditional branch instructions in a pipeline type data processing apparatus comprising:

first means for judging whether or not a conditional branch instruction is valid, wherein said first means for judging whether or not said conditional branch instruction is valid includes:

valid Judging means for judging that said conditional branch instruction is valid when said conditional branch instruction has been input into a pipeline and a branch condition thereof has been decoded, and invalid judging means for judging that said conditional branch instruction is not valid when said conditional branch instruction has not been input into the pipeline or when a taken/not-taken judgement has already been made for said conditional branch instruction;

second means for judging whether or not a condition code necessary for the taken/not-taken judgement to be made for said conditional branch instruction is valid, wherein said second means for judging whether or not said condition code is valid includes means for judging that said condition code is valid when said condition code is derived from calculating an operand of a most recent instruction causing a change in condition code which has been input into the pipeline prior to said conditional branch instruction; and means for selectively making the taken/not-taken judgement for said conditional branch instruction in accordance with results of the judgement made to said conditional branch instruction and said condition code by said first and second means, respectively, wherein said means for selectively making the taken/not-taken judgement includes means for cancelling the taken/not-taken judgement if said conditional branch instruction is judged to be invalid.

7. An apparatus according to claim 6, wherein said means for selectively making the taken/not-taken judgement includes means for comparing the decoded branch condition defined by said conditional branch instruction with the condition code derived from operating the operand of the most recent instruction causing a change in condition code, and judging that a branch is taken when said comparison indicates coincidence of the branch condition and the condition code.

8. An apparatus for controlling conditional branch instructions in a pipeline type data processing apparatus, comprising:

first judging means for judging whether or not a conditional branch instruction is valid and setting a first identifier for indicating the judgement result, wherein said first judging means for setting the first identifier includes:

first means for setting said first identifier to a first state when said conditional branch instruction has been input into a pipeline and a branch condition thereof has been decoded, and second means for setting said first identifier to a second state when said conditional branch instruction has not been input into the pipeline or when a taken/not-taken judgement has already been made for said conditional branch instruction;

second judging means for judging whether or not a condition code necessary for the taken/not-taken judgement made for said conditional branch instruction is valid and setting a second identifier for indicating the judgement result, wherein said second judging means for setting the second identifier includes:

means for setting said second identifier to said first state when said condition code is derived from calculating an operand of a most recent instruction causing a change in condition code which has been input into the pipeline prior to said conditional branch instruction, and means for setting said second identifier to said second state when said condition code has not been derived; and means for selectively making the taken/not-taken judgement for said conditional branch instruction in accordance with the judgement results indicated by said first and second identifier, wherein said means for selectively making a taken/not-taken judgement includes means for cancelling the taken/not-taken judgement if said first identifier is in the second state.

9. An apparatus according to claim 8, wherein said means for selectively making the taken/not-taken judgement includes means for comparing the decoded branch condition defined by said conditional branch instruction with the condition code derived form operating the operand of the most recent instruction causing a change in condition code, and judging that a branch is taken when the comparing step result indicates coincidence of the branch condition and the condition code.

10. An apparatus according to claim 8, wherein said means for selectively making a taken/not-taken judgement for said conditional branch instruction includes means for making said taken/not-taken judgement when said first and second identifiers are both in the first state.

11. An apparatus for controlling conditional branch instructions in a pipeline type data processing apparatus, comprising:

first means for storing a branch condition defined by a conditional branch instruction which has been input into a pipeline and decoded;

second means for storing a condition code necessary for a taken/not-taken judgement to be made for said conditional branch instruction;

condition comparing means for comparing said branch condition and said condition code respectively stored in said first branch condition storing means and said second condition code storing means;

first valid storing means for storing a first identifier for indicating whether or not said conditional branch instruction is valid;

second valid storage means for storing a second identifier for indicating whether or not said condition code is valid;

control means for controlling states of said first and second identifier, wherein said control means includes:

first setting means for setting said first identifier to a first state when said conditional branch instruction has been input into the pipeline and a taken/not-taken judgement has not been made for said conditional branch instruction, and second setting means for setting said first identifier to a second state when said conditional branch instruction has not been input into the pipeline or when the taken/not-taken judgement has already been made for salt conditional branch instruction; and means for making the taken/not-taken judgement for said condition branch instruction based on a state of said first identifier, a state of said second identifier, anti a result of said condition comparison performed by said condition comparing means, wherein said means for making the taken/not-taken judgement includes means for cancelling the taken/not-taken judgement if said first identifier is in the second state.

12. An apparatus according to claim 11, wherein said control means includes third means for setting said first identifier to the first state when said conditional branch instruction has been input into the pipeline and the branch condition thereof has been decoded.

13. An apparatus according to claim 11, wherein said means for making the taken/not-taken judgement includes means for comparing the branch condition defined by the conditional branch instruction which has been input into the pipeline and decoded with the condition code derived from operating an operand of a most recent instruction causing a change in condition code, and judging that a branch is taken when the comparing step result indicates coincidence of the branch condition and the condition code.

14. An apparatus for controlling conditional branch instructions in a pipeline type data processing apparatus, comprising:

first means for storing a branch condition defined by a conditional branch instruction which has been input into a pipeline and decoded;

second means for storing a condition code necessary for a taken/not-taken judgement to be made for said conditional branch instruction;

condition comparing means for comparing said branch condition and said condition code respectively stored in said first branch condition storing means and said second condition code storing means;

first valid storing means for storing a first identifier indicating whether or not said conditional branch instruction is valid;

second valid storage means for storing a second identifier for indicating whether or not said condition code is valid;

control means for controlling states of said first and second identifier, wherein said control means includes:

fourth means for setting said second identifier to the first state when the condition code needed by the conditional branch instruction is valid and to the second state when the condition code needed by the conditional branch instruction is invalid; and means for making the taken/not-taken judgement for said condition branch instruction based on a state of said first identifier, a state of said second identifier, and a result of said condition comparison performed by said condition comparing means;

wherein said means for making the taken/not-taken judgement includes means for cancelling the taken/not-taken judgement when said second identifier is in the second state.

15. An apparatus according to claim 14, wherein said control means includes fifth means for setting said second identifier to the first state when said condition code is derived from of calculating an operand of a most recent instruction causing a change in condition code which has been input into the pipeline prior to said conditional branch instruction.

16. An apparatus for controlling conditional branch instructions in a pipeline type data processing apparatus, comprising:

means for decoding an instruction to be executed;

means for executing the decoded instruction;

means for storing a branch condition defined by a conditional branch instruction which has been decoded by said decoding means;

means for storing a condition code from said means for executing that is necessary for a taken/not-taken judgement to be made for said conditional branch instruction;

condition comparing means for comparing said branch condition and said condition code respectively stored in said branch condition storing means and said condition code storing means;

first means for storing a first identifier indicating whether or not said condition branch instruction is valid;

first means for setting the first identifier to a valid state when the conditional branch instruction has been decoded and the branch condition thereof has been obtained;

second means for storing a second identifier indicating whether or not said condition code is valid;

second means for setting the second identifier to a valid state when said means for executing has provided the branch condition and setting to an invalid state when said means for decoding has decoded an instruction which will cause a change in the condition code; and means for making the taken/not-taken judgement for said condition branch instruction based on a state of said first identifier, the valid state of said second identifier, and the result of a condition comparison performed by said condition comparing means.

17. An apparatus for controlling conditional branch instructions in a pipeline type data processing apparatus, comprising:

means for decoding an instruction to be executed;

means for executing the decoded instruction to provide a condition code, said means for executing providing the condition code when executing the instruction causing a change the condition code;

first means for storing a branch condition defined by a conditional branch instruction which has been decoded;

second means for storing the condition code from said means for executing that is necessary for a taken/not-taken judgement to be made for said conditional branch instruction;

condition comparing means for performing a condition comparison using said branch condition and said condition code respectively stored in said branch condition storing means and said condition code storing means;

third means for storing a first identifier indicating whether or not said condition branch instruction is valid;

means for setting the first identifier to a valid state when the conditional branch instruction has been decoded and the branch condition thereof has been obtained;

fourth means for storing a second identifier indicating whether or not said condition code is valid, said second identifier being kept in a valid state if an instruction causing no change in the condition code appearing in an instruction train subsequent to the instruction by executing which said means for executing providing the condition code; and means for making the taken/not-taken judgement for said condition branch instruction based on a state of said first identifier, the valid state of said second identifier, and a result of the condition comparison performed by said condition comparing means.

* * * * *